United States Patent [19]

Reuschel et al.

[11] 3,853,974

[45] Dec. 10, 1974

[54] METHOD OF PRODUCING A HOLLOW BODY OF SEMICONDUCTOR MATERIAL

[75] Inventors: Konrad Reuschel, Vaterstetten; Wolfgang Dietze, Munich, both of Germany

[73] Assignee: Siemens Aktiengesellschaft, Munich, Germany

[22] Filed: Feb. 21, 1973

[21] Appl. No.: 334,294

Related U.S. Application Data

[63] Continuation of Ser. No. 87,202, Nov. 5, 1970, abandoned.

[30] Foreign Application Priority Data

Apr. 6, 1970 Germany .......................... 2016339

[52] U.S. Cl. ............... 264/81, 117/106 A, 148/174, 264/65, 264/66

[51] Int. Cl. ......................... B01j 17/28, B29c 13/04

[58] Field of Search ........... 264/81, 56, 65, 332, 66, 264/59; 117/106 A, 106 R, 212; 148/174

[56] References Cited

UNITED STATES PATENTS

| | | | |
|---|---|---|---|
| 2,999,735 | 9/1961 | Reuschel | 264/81 |
| 3,139,363 | 6/1964 | Baldrey | 264/81 |
| 3,476,640 | 11/1969 | Sirtl et al. | 264/81 |
| 3,484,311 | 12/1969 | Benzing | 117/106 A |
| 3,540,871 | 11/1970 | Dyer | 264/81 |
| 3,686,378 | 8/1972 | Dietze | 264/81 |

*Primary Examiner*—Jeffery R. Thurlow

*Attorney, Agent, or Firm*—Herbert L. Lerner

[57] ABSTRACT

An at least unilaterally open hollow body of silicon or other semiconductor material is produced by thermally reducing a gaseous compound of the same material and precipitating the segregated material upon a heated carrier of different material, preferably graphite or other industrial carbon, and thereafter removing the resulting hollow semiconductor body from the carrier. The gaseous compound is supplied to the heated carrier in mixture with a reduction gas, preferably hydrogen, in a molar ratio that substantially corresponds to the reaction equilibrium at the carrier temperature obtaining at the beginning of the reduction and precipitation process. After the precipitated hollow body has reached a layer thickness of a few microns, the molar ratio is changed so as to increase the rate of precipitation. The method can be modified by changing the throughput of the gaseous mixtures from a lower to a higher value after a layer thickness of a few microns has been reached and then continuing the precipitation at a higher rate until the desired full layer thickness is obtained.

13 Claims, 2 Drawing Figures

METHOD OF PRODUCING A HOLLOW BODY OF SEMICONDUCTOR MATERIAL

Figure 1:
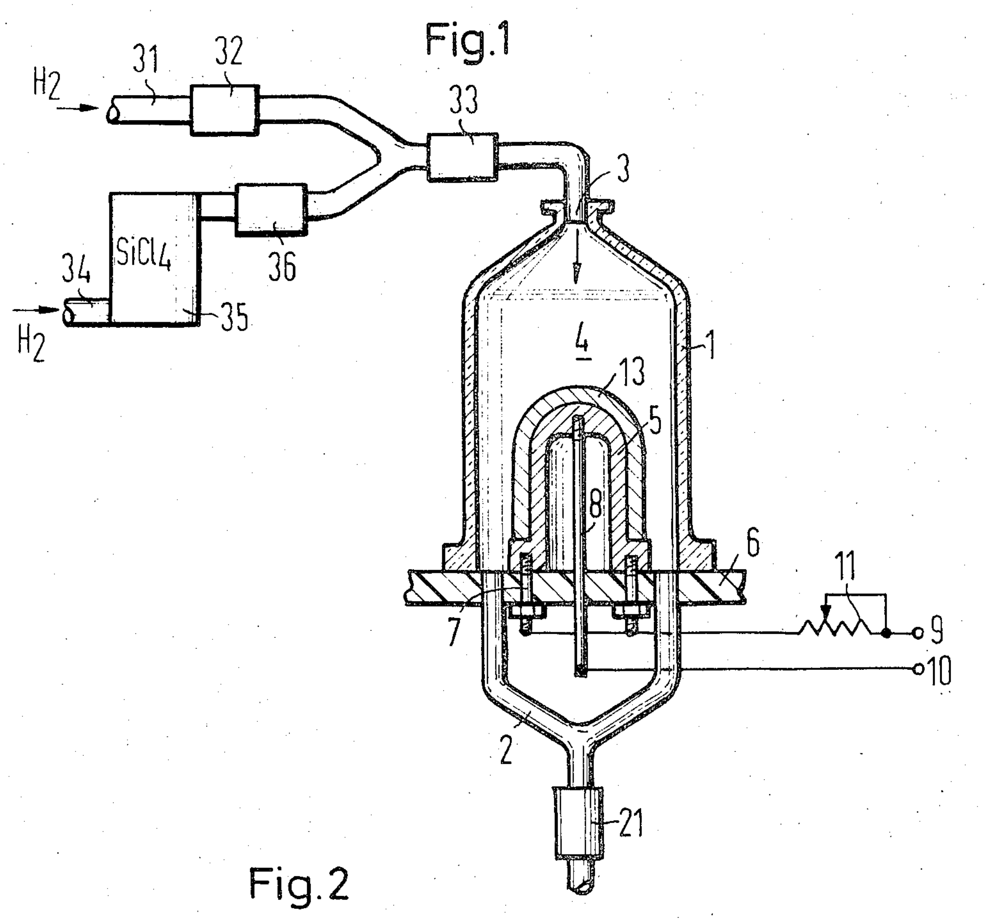

This is a continuation, of application Ser. No. 87,202, filed Nov. 5, 1970, now abandoned.

Our invention relates to the production of unilaterally or bilaterally open, hollow bodies of semiconductor material by segregating the material from a gaseous compound thereof and precipitating the material upon a heated carrier of different material, whereafter the carrier is removed, preferably without destruction, when the precipitated semiconductor material has attained a sufficiently large layer thickness.

Such methods are described in the copending application Ser. No. 285,309 filed Aug. 31, 1972 which is a continuation of application Ser. No. 58,459, filed July 27, 1970 by W. Dietze for a METHOD OF PRODUCING AN AT LEAST UNILATERALLY OPEN, HOLLOW BODY OF SEMICONDUCTOR MATERIAL. Methods of this type, as well as equipment preferentially used therefor are further described in the copending application of K. Reuschel et al Ser. No. 87,205, filed Nov. 5, 1970, now U.S. Pat. No. 3,686,378 of Aug. 22, 1972.

It is an object of our present invention to improve methods of the above-mentioned general type so as to afford the production of semiconductor hollow bodies whose wall thicknesses, as a rule, are more uniform and of a more homogenious constitution than heretofore attainable.

Another object of the present invention is to afford the production of hollow bodies, such as tubes, cups or ampules, that are open on at least one side thereof and which are free of wartlike protuberances or the like defects as heretofore encountered with methods of the type outlined above.

Still another, more specific object of our invention relating to the production of at least unilaterally open, hollow bodies of silicon or other semiconductor material is to avoid the occurrence of locally thin or gas-permeable spots as may render the hollow bodies unsuitable for certain electronic fabricating processes, particularly for the so-called ampule-diffusion treatment of semiconductor wafers, tablets or platelets.

The requirement for uniform wall thickness and a prescribed crystalline constitution of hollow semiconductor bodies made by the above-mentioned processes is not readily met. This is because, when semiconductor material is precipitated from a gaseous compound onto a heated carrier of different material, there is the danger that, particularly at the commencement of the precipitation process; there will occur a spontaneous formation of crystallites in the form of needles or dendrites which extend perpendicularly or at an angle to the surface of the heated carrier structure. When this occurs, further semiconductor material will precipitate upon the needles which thus grow in size and tend to form wart-like protuberances. This prevents a uniform and homogenious formation of the hollow-body walls. In some cases, for example, the wall thickness of the resulting hollow bodies may become so thin at some localities that the walls are gas-permeable at these localities. Aside from the inhomogenity in geometrical wall thickness, the tendency to permit gas to pass through the walls renders such hollow bodies unsuitable for various purposes. For example, they are not applicable as processing containers for the ampule diffusion of semiconductor platelets or wafers stacked into such containers for the purpose of doping the wafer surfaces by diffusion.

On the other hand, in certain localities the walls may also become much thicker than at others. That is, the outer diameter of such a hollow body often exhibits at some localities a larger wall thickness than needed or desirable. As a rule, the ampule diffusion process is performed by accommodating the hollow body of semiconductor material, filled with semiconductor wafers or platelets, into a quartz tube whose diameter is made as small as feasible. This requirement can be met with particular ease when the wall thickness of the hollow body of semiconductor material is uniform rather than having the above-mentioned wartlike protuberances.

There is, however, another reason for best feasible uniformity in wall thickness of a hollow body made of semiconductor crystalline material. That is, in such a hollow body, the semiconductor wafers, platelets, or the like are subjected not only to diffusion but thereafter must be cooled inside the tubular body. It is desirable that, during the cooling period, the semiconductor accommodated within the ampule remain free of internal tensions. For that reason, the design of the ampule should be such that the temperature gradient in the material will remain as low as possible. An ampule made of semiconductor material which, at the diffusion temperatures, is a very good heat conductor, can satisfactorily meet this requirement only if its wall thickness is everywhere the same.

To achieve the above-mentioned objects and in accordance with our invention, we proceed during the reduction and precipitation process, resulting in the formation of the at least unilaterally open, hollow semiconductor body, in such a manner that the precipitation of semiconductor material from the gaseous phase initially proceeds at a slow rate until the precipitated material has reached a given layer thickness in the order of one to a few microns, and thereafter we increase the rate of reduction and precipitation until the desired full wall thickness of the precipitated hollow body, for example in the order of 1 millimeter is attained.

According to another, more specific feature of our invention, we supply the gaseous compound of the semiconductor material in mixture with a reduction gas in such a ratio that from the commencement of the reaction at a given pyrolytic temperature a reaction near the reaction equilibrium will adjust itself. The temperature just mentioned is the minimum reduction and precipitation temperature which, for example for silicochloroform is near 1,100°C.

By virtue of the just mentioned feature, an initially slow and uniform growth of the semiconductor crystals on the carrier is secured. A formation of many small, tree-like crystallites or dendrites, as would appear if a greatly excessive amount of the semiconductor gaseous compound were present in the reaction gas mixture, is thus avoided.

Figure 2:
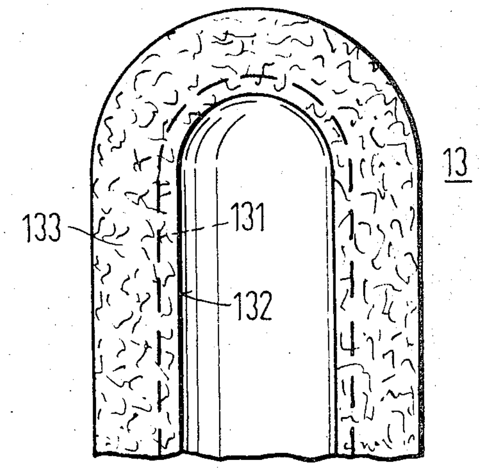

The invention will be further described with reference to the accompanying drawing in which;

FIG. 1 shows schematically an by way of example an embodiment of equipment for performing the method of the invention and, FIG. 2 shows schematically and in section an ampule made in accordance with the invention and corresponding to the one produced by the equipment according to FIG. 1.

While various processing equipments are applicable for the purpose of the present invention, we prefer using, and have shown in FIG. 1, a device corresponding substantially to the invention of REUSCHEL et al. disclosed in the above-mentioned copending application Ser. No. 87,205 now U.S. Pat. No. 3,686,378. The device, as illustrated, comprises a recipient vessel 1 which communicates with several outlets 2 for the spent gases and has an inlet 3 for supplying the reaction-gas mixture. Mounted in the processing chamber 4 of vessel 1 is a hollow carrier structure 5 of graphite or the like industrial carbon. The carrier 5 forms a relatively thick flange which, like the bottom flange of the recipient vessel 1 is seated upon a supporting plate 6 of conducting or insulating material. The flange of the carrier 5 is fastened to the plate 6 with bolts 7 which are electrically connected with one another to serve as current supply leads. The second current supply lead for the carrier 5 is formed by a conductor rod 8. The bolts 7 and the rod 8 are connected to respective current input terminals 9 and 10 through a control rheostat 11. When current is passed through the circuit, the carrier 5 becomes heated up to the desired reaction temperature. An induction heater winding (not shown) may coaxially surround the vessel 1 at the height of the carrier 5 in order to expedite the initial heating.

The reaction gas mixture is supplied to the inlet 3 from two hydrogen supply pipes 31 and 34. The hydrogen from pipe 31 passes through a first ratio control valve 32 and through an adjustable throughput control valve 33. The hydrogen from pipe 34 is caused to bubble through the liquid semiconductor compound, for example $SiCl_4$ contained in a vessel 35. The entrained vapor of the compound together with the hydrogen then pass through a second ratio control valve 36 and thereafter through the throughput control valve 33. Valves 32 and 36 are to be set in the proper conjoint relation to each other. Another throughput control valve 21 is shown connected to the outlets 2, although it will be understood that only one of the throughput control valves 33, 21 may be sufficient.

As explained, when the carrier 5 is heated to the processing temperature, preferably after rinsing the vessel with hydrogen or inert gas, — the precipitation of semiconductor material onto the carrier is started at a low rate of deposition until it has reached a layer thickness of at least about 1 micron and is thereafter continued at the normal, higher rate. This is done by first setting the two ratio control valves 32 and 36 to the initially desired hydrogen-to-compound ratio and subsequently setting these valves to the normal, higher ratio; or by setting the ratio control valves to the normal ratio and first reducing the throughput at valve 33 and/or valve 21; or by conjointly applying both ways of deposition-rate control.

FIG. 2 shows schematically a unilaterally open, tubular ampule 13 produced by the pyrolytic processing device in FIG. 1. As described, the precipitation takes place at a greatly reduced rate until the precipitated hollow body 13 reaches a wall thickners in the order of one micron, for example 2 to 5 microns. In FIG. 2 the initially deposited layer is schematically identified by a broken line and denoted by 131. For the reasons explained, the inner surface 132 of the resulting tubular structures is perfectly smooth, i.e. entirely free of protuberances, and the diameter is uniform throughout the entire length of the product. When continuing and completing the precipitation at the higher rate, the additional material under 133 is precipitated until the body obtains the desired ultimate wall thickness, for example in the order of 1 millimeter. The crystalline structure in the portion 133 grows upon the slowly and orderly deposited first crystal layer 131. This results in an orderly and uniform crystalline constitution throughout the entire thickness of the product. The outer wall surface of the tubular body also is smooth and uniform in diameter. The reason for these improved characteristics of the product are the following.

In the pyrolytic precipitation of semiconductor material for the gaseous phase upon the heated carrier, it is the initial processing stage that requires formost attention. At this stage no or only little semiconductor material has as yet precipitated upon the carrier, and the reaction gas mixture introduced into the reaction vessel, consisting for example of molecular hydrogen as reduction gas mixed with the gaseous compound of the semiconductor material, for example silicochloroform, still contains an excessive quantity of the compound. Hence, according to the mass-action law, a very rapid conversion of $SiHCl_3$ and $H_2$ into silicon and hydrogen chloride HC1 will take place. This promotes the formation of dendritic crystallites as mentioned above.

In order to secure a slow crystal growth in the first stage of the precipitation process, we select, for example in the production of a silicon hollow body, such a mixing ratio at the beginning of the precipitation process that at first a quantity of no more than 0.02 to 0.1 g Si/cm²h is precipitated until the growing deposit reaches a layer thickness of a few microns, for example about 2 to 5 microns. Then we change the ratio of the gas mixture so that more silicon is precipitated, namely a quantity within the range of 0.05 to 0.2g Si/cm²h. We have found it to be particularly economical to initially set the ratio for a deposition of about 0.05 g Si/cm²h and thereafter for 0.1 Si/cm²h.

With molecular hydrogen $H_2$ as reduction gas and $SiHCl_3$ (silicochloroform) as semiconductor compound, we employ a reaction temperature of about 1,200°C and adjust the mole ratio of the two substances within the range of 1:0.02 to 1:0.2. At the beginning of the reaction and until a layer of a few micron thickness is precipitated, we operate with a throughput that corresponds to 1/100 to ½ of the normal throughput. It is particularly economical to operate with a mole ratio of approximately 1:0.08. This embodiment can be expressed by the general formula:

$$1\ SiHCl_3 + 12\ H_2 \rightleftharpoons 1\ Si + 3HCl + 11\ H_2$$

This reaction takes place at approximately 1,200°C close to the reaction equilibrium. It has been found advisable to normally operate with a throughput of reaction gas mixture in the amount of approximately 5 l/hcm² (liter per hour × cm²) wherein l denotes throughput of reaction gas mixture in liters, *h* denotes the time unit for 1 hour, and cm² denotes the unit of surface of 1 square centimeter, referring to the surface of the hollow body onto which the semiconductor material is to be precipitated; but at the beginning of the reaction this normal throughput is reduced down to within the range of about 0.05 to 2.5 l/hcm² until the layer thickness of the precipitated semiconductor body is 2 to 5 microns for example.

When using tetrachlorsilane $SiCl_4$ as gaseous compound, it is recommended to adjust a temperature of about 1,200°C and normally operate with a mole ratio of 1:0.005 to 1:0.05. The performance is especially economical with a mole rate of about 1:001. In this case, too, a reduced throughput is adjusted at the beginning of the reaction until a layer of a few micron thickness is precipitated, the reduced throughput being 1/100 to ½ of the normal throughput amounting for example to 5 1 hcm² with reference to the surface upon which the semiconductor material is being precipitated.

When using dichlorsilane $SiH_2Cl_2$ as semiconductor gaseous compound, the reaction temperature is approximately 1,100°C and the preferred mole ratio is in the range of 1:0.05 to 1:0.5. As in the last preceding example, the reaction is commenced and conducted up to the precipitation of a layer having a few microns thickness by operating with a reduced gas throughout amounting to 1/100 to ½ of the normal throughput and consequently corresponding to a deposition rate of about 0.05 to 0.25 l/hcm² surface. With dichlorsilane the performance is especially economical with a mole ratio of about 1:0.15.

A further improvement toward uniform wall thickness is obtained by lowering during the precipitating operation the temperature at the surface upon which the precipitate is deposited. Preferably, the temperature reduction during the entire process is approximately 30 to 100°C, particularly suitable reduction being about 20°C/mm wall thickness. Without reduction in temperature, the heat radiation resulting from the increasing wall thickness may cause large temperature differences between the outer side and the inner side of the hollow body. This may cause fissures or cracks in the walls which may make the hollow body useless.

As explained, the prevention of irregular crystallites or dendrites makes it essential to keep the conversion of the semiconductor compound into a solid material as close as feasible near the reaction equilibrium. For that reason, and in accordance with a further feature of our invention, it is in many cases preferable to introduce hydrogen halide, preferably hydrogen chloride HCl, into the reaction gas, at least at the beginning of the precipitation process. This modifies the reaction in the sense of retardation. A similar effect results from the use of $SiH_4$ for the production of hollow bodies, although in the latter case, an addition of hydrogen halogenide is indispensable.

The action may also be retarded by the addition of inert gas, for example argon or helium. This also applies to the other reaction gas mixtures mentioned hereinabove.

The process according to the invention, described above with reference to the production of the silicon hollow body, is analogously applicable to the production of hollow bodies of silicon carbide SiC, germanium Ge, and III/V compounds such as GaAs, or InSb. For example, a germanium hollow body can be made by precipitating it from a mixture of $H_2$ with Ge $HCl_3$ or $GeCl_4$ in a manner corresponding to the method of the invention.

We claim:

1. The method of producing an at least unilaterally open, hollow body of silicon by thermally reducing a gaseous carrier halide or hydride of silicon and precipitating the segregating silicon upon a graphite carrier heated to the segragating temperature of the gaseous carrier and thereafter removing the graphite carrier from the resulting hollow silicon body, said method comprising the steps of supplying to the heated graphite carrier a mixture of hydrogen and said gaseous carrier halide or hydride of silicon in a molar ratio of said hydrogen to said gaseous carrier within the range from 1:0.005 and 1:0.5 corresponding substantially to the reaction equlibrium at the segregation temperature to thereby avoid the formation of crystallites or dendrites; applying a flow rate to precipitate 0.002 – 0.1 g Si/h cm², wherein Si denotes silicon, *h* denotes a time unit of one hour and cm² denotes a surface unit of one square centimeter and relates to the surface area upon which the semiconductor material is to be precipitated, until the precipitated silicon body has reached a layer thickness of at least 1 micron; and thereafter increasing the flow rate of the mixture to increase the rate of precipitation above the rate of precipitation in forming said layer thickness of at least 1 micron to an amount within the range of 0.05 – 0.2 g Si/h cm².

2. The method as claimed in claim 1, wherein the initial slow rate of silicon precipitation is about 0.05 g Si/cm²h and the increased rate is about 0.1 g Si/cm²h.

3. The method as claimed in claim 1, wherein the gaseous halide is $SiCl_4$, and further comprising setting at a reaction temperature of about 1,200°C the molar ratio of hydrogen to $SiCl_4$ to within the range from 1:0.005 to 1:0.05, initially maintaining a reduced throughput of 0.05 – 2.5 liters/h cm² until the precipitated layer of silicon has reached a thickness of at least about 1 micron, and thereafter applying a throughput of about 5 liters/h cm².

4. The method as claimed in claim 1, wherein the gaseous halide is $SiH_2Cl_2$, and further comprising setting at a reaction temperature of about 1,100°C the molar ratio of hydrogen gas to $SiH_2Cl_2$ to within the range from 1:0.05 to 1:0.5, initially maintaining a reduced throughput of 0.05 – 2.5 liters/h cm² until the precipitated layer of silicon has reached a thickness of about 2 or 5 microns, and thereafter applying a throughput of about 5 liters/h cm².

5. The method as claimed in claim 1, wherein hydrogen halide and $H_2$ and a gaseous halogen or hydride of silicon are admixed.

6. The method as claimed in claim 1, wherein hydrogen chloride and $H_2$ and a gaseous halogen or hydride of silicon are admixed.

7. The method as claimed in claim 1, wherein an inert gas and $H_2$ and a gaseous halogen or hydride of silicon are admixed.

8. The method as claimed in claim 1, wherein the silicon hydride is $SiH_4$.

9. The method as claimed in claim 2, wherein the gaseous halide is $SiHCl_3$, and further comprising setting at a reaction temperature of about 1,200°C the molar ratio of hydrogen to $SiHCl_3$ to within the range from 1:0.02 to 1:0.2, initially maintaining a reduced throughput of 0.05 – 2.5 liters/h cm² until the precipitated layer of silicon reaches a thickness of about 2 or 5 microns, and thereafter applying a throughput of about 5 liters/h cm².

10. The method as claimed in claim 3, wherein the molar ratio of $H_2$ to $SiCl_4$ is about 1:0.01.

11. The method as claimed in claim 4, wherein the molar ratio of $H_2$ to $SiH_2Cl_2$ is about 1:0.15.

12. The method as claimed in claim 8, wherein the gases are $SiH_4$ and HCl.

13. The method as claimed in claim 9, wherein the molar ratio of $H_2:SiHCl_3$ is about 1:0.08.

* * * * *